(12) United States Patent
Arimilli et al.

(10) Patent No.: US 6,415,424 B1
(45) Date of Patent: Jul. 2, 2002

(54) MULTIPROCESSOR SYSTEM WITH A HIGH PERFORMANCE INTEGRATED DISTRIBUTED SWITCH (IDS) CONTROLLER

(75) Inventors: Ravi Kumar Arimilli, Austin; Leo James Clark, Georgetown; Jerry Don Lewis, Round Rock; Bradley McCredie, Austin, all of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/437,195

(22) Filed: Nov. 9, 1999

(51) Int. Cl.[7] .................... G06F 17/50; G06F 13/40; G06F 15/173
(52) U.S. Cl. ................ 716/8; 716/12; 710/317; 712/38
(58) Field of Search ............ 716/1–21; 710/1–269; 712/38–39, 43

(56) References Cited

U.S. PATENT DOCUMENTS

| | | | | |
|---|---|---|---|---|
| 5,226,125 A | * | 7/1993 | Balmer et al. | 710/317 |
| 5,359,536 A | * | 10/1994 | Agrawal et al. | 716/16 |
| 5,644,496 A | * | 7/1997 | Agrawal | 716/17 |
| 5,887,146 A | * | 3/1999 | Baxter et al. | 710/104 |
| 5,949,982 A | * | 9/1999 | Frankeny et al. | 710/322 |
| 6,070,003 A | * | 5/2000 | Gove et al. | 710/317 |

OTHER PUBLICATIONS

Savari ("Capability analysis of distributed switching systems in interprocessor communications", Proceedings of TRICOMM '91, IEEE Conference on Communications Software: Communications for Distributed Applications and Systems, Apr. 18, 1991, pp. 243–256).*

* cited by examiner

Primary Examiner—Matthew Smith
Assistant Examiner—Phallaka Kik
(74) Attorney, Agent, or Firm—Volel Emile; Bracewell & Patterson, L.L.P.

(57) ABSTRACT

A data processing system having a modified processor chip and external components to the processor chip. The processor chip is interconnected to the external components via point-to-point bus connections controlled by an integrated distributed switch (IDS) controller. The IDS controller is placed, during chip design, in the upper layer metals of the processor chip. When the data processing system is a multi-chip multiprocessor data processing system, the IDS controller operates to provide a pseudo switching effect whereby the processor is directly connected to each external component. The IDS controller permits the processor to have greater communication bandwidth and reduced latencies with the external components. It also allows for a connection to distributed external components such as memory and I/O, etc. with overall reduced system components.

10 Claims, 3 Drawing Sheets

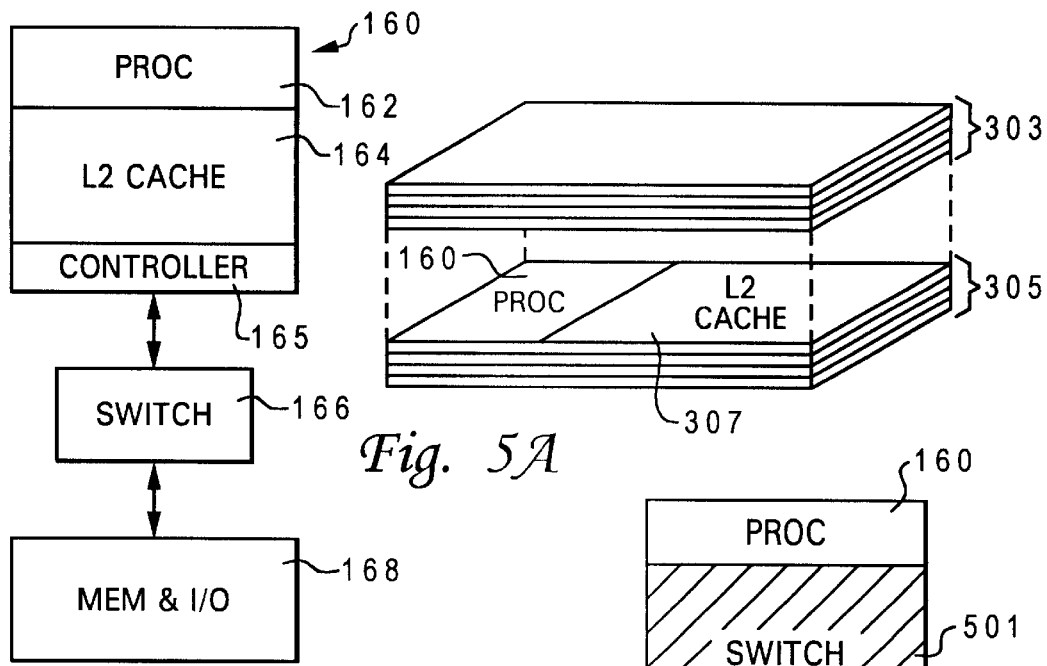
Fig. 2A
Fig. 5A
Fig. 5B
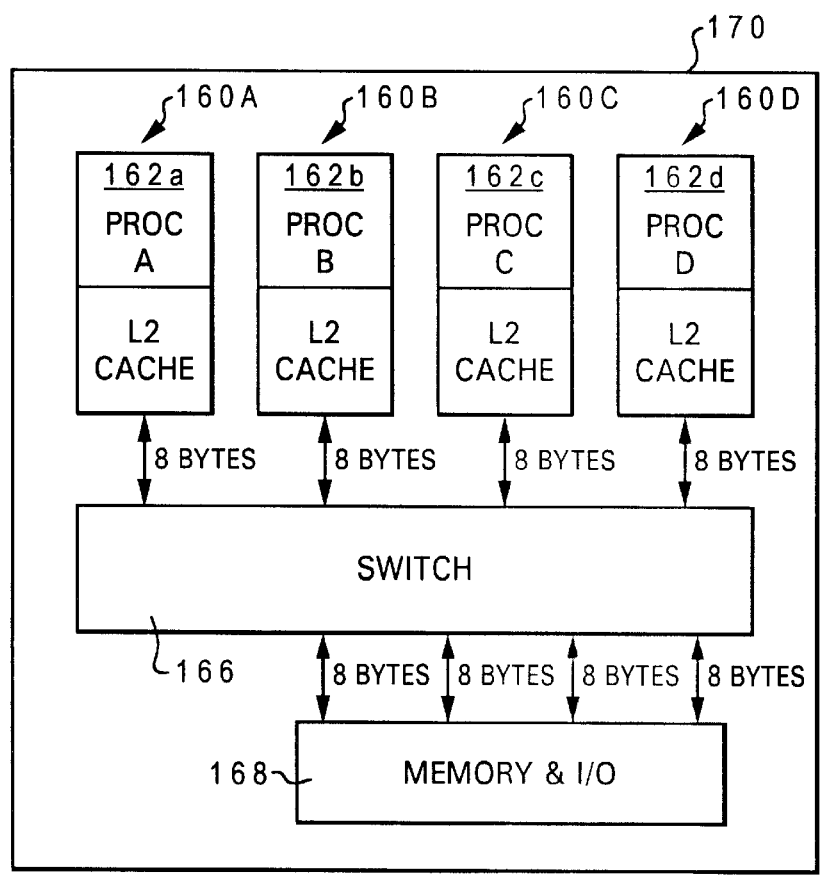
Fig. 2B

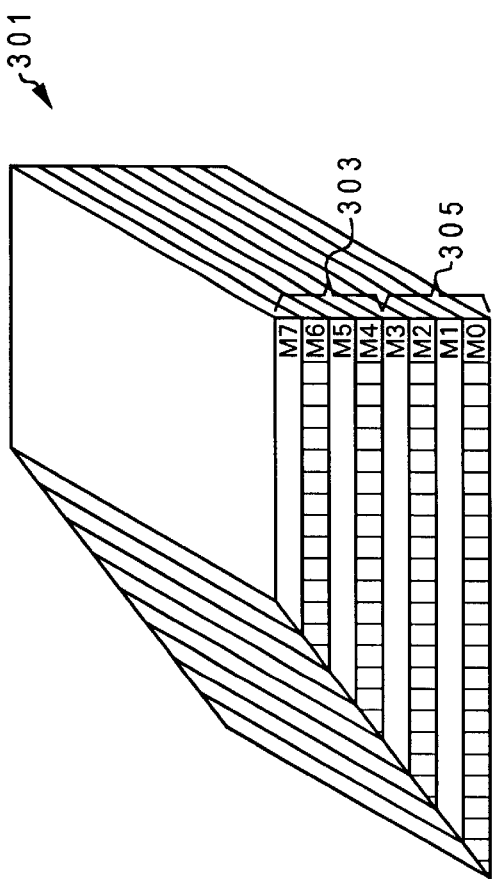
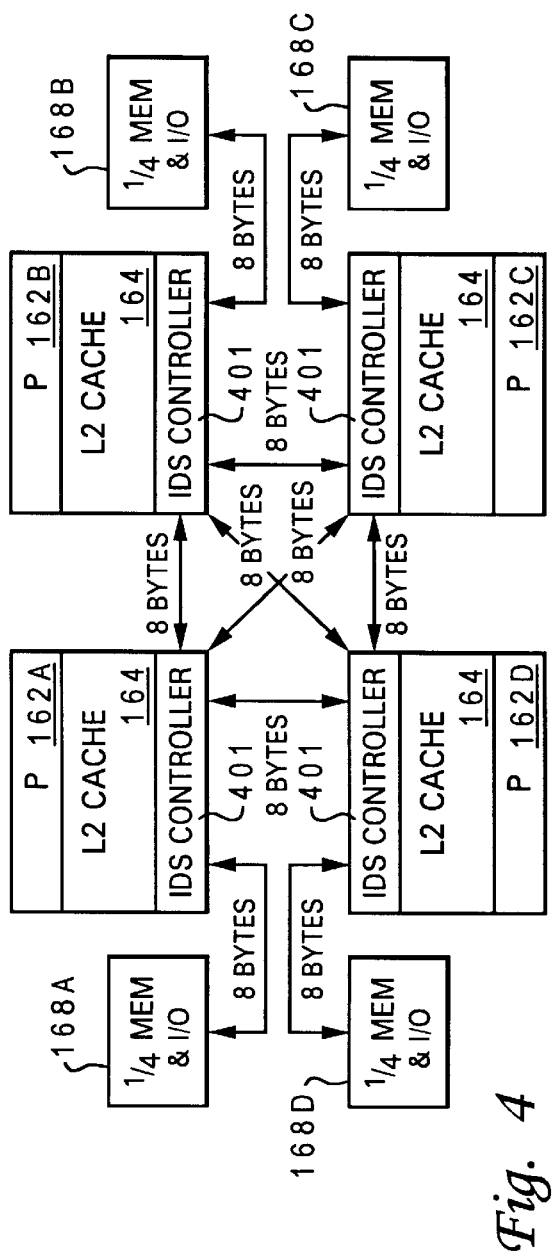
Fig. 3
Fig. 4

MULTIPROCESSOR SYSTEM WITH A HIGH PERFORMANCE INTEGRATED DISTRIBUTED SWITCH (IDS) CONTROLLER

The present invention is related to the subject matter of the following commonly assigned, copending U.S. patent applications Ser. No. 09/437,194 entitled "Data Processing System With Fully Interconnected System Architecture (FISA)" and filed concurrently herewith. The content of the above-referenced application is incorporated herein by reference.

BACKGROUND OF THE INVENTION

1. Field of the Invention

The present invention generally relates to data processing systems and, more particularly, to an improved data processor with on-chip interconnects. Still more particularly, the present invention refers to an improved data processor wherein processor interconnects are placed on chip utilizing the higher level metal layers.

2. Description of the Related Art

Increasing performance and reliability and decreasing component size or required space are important aspects of data processing system development. System developers continually search for ways to increase the system processing performance while maintaining reliability in the transmission processes, without incurring additional hardware costs. Often such development is focused on faster overall processors. However, this development may also center around increasing the capacity of data buses and other buses or increasing the propagation speed between system components. Those skilled in the art are familiar with the trend of increasing the capacities of the buses within a data processing system to improve efficiency of the system.

An integrated circuit (I/C) is a device consisting of a number of connected circuit elements, such as transistors and resistors and functional combinations thereof, fabricated on a single chip of silicon crystal or other semiconductor material. In integrated circuit fabrication technology, an ever-increasing number of integrated circuit devices are being built into chips. This growing number of devices requires a correspondingly larger amount of space and greater numbers of input/output (I/O) connections to and from the chip.

Typically, the I/O connections are conductive metal pathways, connected to the metal leads protruding from the edges of the I/C chips. These I/O connections are referred to as data buses and each set of parallel data buses is characterized by the number of bits it can transfer at a single time, equivalent to the number of parallel conducting paths (which can be thought of as wires) wired to the metal leads of an integrated circuit chip. The number of these parallel conducting paths is typically referred to as the width of the bus.

The miniaturization of integrated circuits has made it possible to pack more and more data processing power into a small volume. The increased data processing power has made it necessary to provide more metal leads (I/O connections) for each I/C chip. However, the small volume of the I/C chip (i.e., small edge surface area) has also resulted in such metal leads being tightly spaced. Consequently, on a printed circuit board utilizing modern integrated circuits, the I/O connections of the I/C chips are physically very close. Accordingly, the conductive paths, at least where they connect with individual I/O connections, are also in very close proximity to each other.

I/C chips are manufactured with different numbers of metal layers. One of the more popular chip topologies has eight metal layers with the layers configured in a criss-crossed manner. The intra-chip components, which may comprise of a processor, higher level cache (or caches), and cache controller are typically located within the lower layers of metal and require large amounts of transistors. Thus the lower metal layers of a chip are primarily used to connect transistors and other logic components.

While the limit to the number of conductors practicably connected in parallel is rapidly being approached, the processing power of integrated circuits continues to increase while the volume of the I/C chip continues to shrink.

One common I/C chip is the processor chip utilized within a data processing system. Typically, processors and higher level caches are located on a processor chip, which is designed with a plurality of buses extending off of the edges of the chip. Current chip manufacture allows for the placement of multiple processors on a single chip. These chips in turn have a set of dedicated buses through which the processors communicate to external components such as memory, input/output (I/O) devices and other processors. These buses provide the connection (via the system bus) required by the processor to external (i.e., off-chip) components such as system memory and other processors in a multi-chip configuration. Current designs of data processing systems involve coupling together several of these processor chips to create multi-processor data processing systems (or symmetric multiprocessor (SMP) data processing systems).

The improvements in silicon technology result in the reduction in size of the chip components (eg., transistors) and a corresponding increase in processor frequencies. The increased processor frequencies in turn lead to higher levels of cache misses. One way of reducing the number of cache misses, while utilizing the extra intra-chip space due to smaller processor transistors, is by increasing the size of the intra-chip L2 caches. This necessitates larger numbers of transistors which make up the primary component of caches. The (lower) metal layers with the resulting larger L2 caches are therefore extremely inundated with transistor interconnects. In contrast, the upper metal layers of the chip are traditionally free of transistors and sparingly utilized.

Traditionally data processing systems were designed with single processor chips having one or more central processing units (CPU) and a tri-state multi-drop bus. In these traditional single chip data processing systems, all bus interfaces were utilized by memory, other caches, and input/output (I/O) devices. With the fast growth of multi-processor data processing systems, building larger scalable SMPs requires the ability to hook up multiple numbers of these chips utilizing the bus interface.

One recent development in improving efficiency of communication between chip components with external components, such as other chips and memory, without necessarily requiring larger numbers of on-chip connectors is the utilization of an off-chip switch connector. Off-chip switches typically are comprised of large masses of wire interconnects which provide multiple point-to-point connections between chip components and external components. This topology is referred to as the tri-state point-to-point bus topology.

In more recent SMP topologies, the conventional tri-state system buses have been replaced by switches. Switches typically comprise of a large number of connectors which provide direct connection between the processor chip and each of the external components coupled to it. Switch topologies provide faster/direct connection between components leading to more efficient and faster processing. In these switch based systems, the switches are located on the processing system's motherboard and are designed as separate and individual components on the data processing system. Switches are very wire intensive, and requires large amounts of silicon and space on the data processing system's motherboard.

Another topology implemented within the industry is the uni-directional point-to-point bus topology which also utilizes a switch but provides individual buses to connect each system component to another. Although this approach provides higher frequency buses, the limitations of a switch topology, as previously described, still exist.

The present invention recognizes that it would therefore be desirable and advantageous to have a data processor which allows for more efficient routing of signals and/or data between the processor and other components coupled to the processor. It would also be desirable to have a data processing system which implements a more efficient routing mechanism without requiring separate space on the data processing system's motherboard or additional chip space (i.e., without incurring additional hardware costs). It would further be desirable to have a processor which utilizes previously unused or sparsely used higher layers of metals of a processor chip to implement an integrated, distributed switch controller to provide for greater overall interconnect bandwidth and reduced latencies while allowing more efficient utilization of the processor chip.

SUMMARY OF THE INVENTION

It is therefore one object of the present invention to provide an improved data processor.

It is another object of the present invention to provide an improved data processor having an Integrated, Distributed Switch (IDS) controller.

It is yet another object of the present invention to provide to an improved data processor having an Integrated, Distributed Switch (IDS) controller placed intra-chip in the upper layer metals providing lower latencies and increased data bandwidths.

The foregoing objects are achieved as follows. A data processing system is describe having a processor chip and external components to the processor chip. The processor chip is interconnected to the external components via point-to-point bus connections controlled by an integrated distributed switch (IDS) controller. The IDS controller is placed, during chip design, in the upper layer metals of the processor chip. When the data processing system is a multi-chip multiprocessor data processing system, the IDS controller operates to provide a pseudo switching effect whereby the processor is directly connected to each external component. The IDS controller permits the processor to have greater communication bandwidth and reduced latencies with the external components. It also allows for a connection to distributed external components such as memory and I/O, etc. with reduced overall external components.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2A depicts a processor unit having on-chip L2 cache and a switch in accordance with one embodiment of the present invention;

FIG. 2B depicts a multi-chip multiprocessor representation of FIG. 2A in accordance with another embodiment of the present invention;

FIG. 3 depicts the eight metal layers of a I/C chip in accordance with one embodiment of the present invention;

FIG. 4 depicts a four chip multiprocessor having a distributed and integrated switch topology in accordance with a preferred embodiment of the present invention; and FIGS. 5A and 5B illustrate a switch being integrated on the upper level metallization of an I/C chip in accordance with a preferred embodiment of the present invention.

DESCRIPTION OF THE PREFERRED EMBODIMENTS

Figure 1:
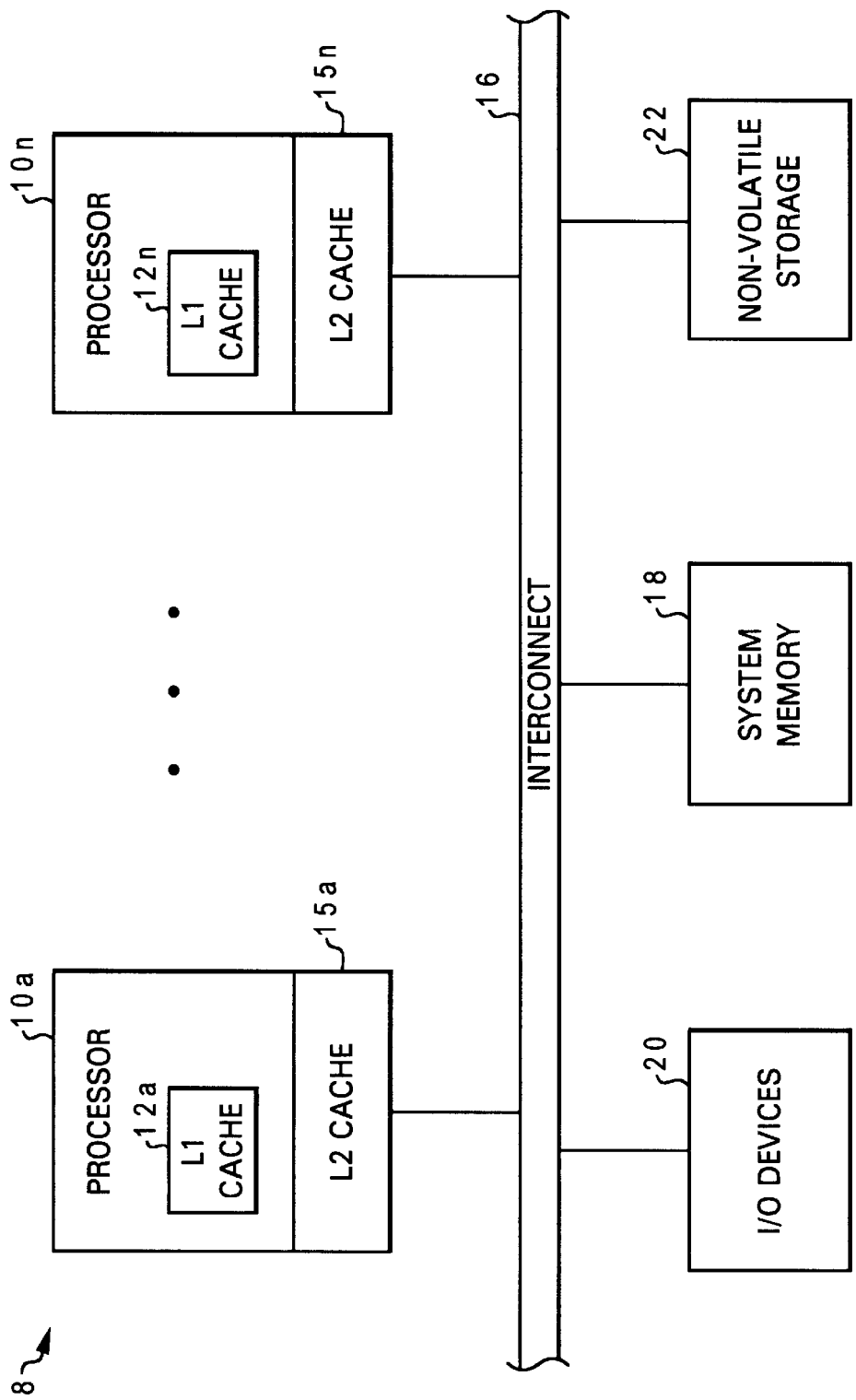
FIG. 1 is a block diagram of a conventional computer system as utilized within the invention.

With reference now to the figures, and in particular with reference to FIG. 1, there is illustrated a high level block diagram of a multiprocessor data processing system in accordance with the present invention. As depicted, data processing system 8 includes a number of processors 10a–10n, which operates according to reduced instruction set computing (RISC) techniques. Processors 10a–10n preferably comprises one of the PowerPC™ line of microprocessors available from International Business Machines Corporation; however, those skilled in the art will appreciate that other suitable processors can be utilized. In addition to the conventional registers, instruction flow logic and execution units utilized to execute program instructions, each of processors 10a–10n also includes an associated one of on-board level-one (L1) caches 12a–12n, which temporarily store instructions and data that are likely to be accessed by the associated processor. Although L1 caches 12a–12n are illustrated in FIG. 1 as unified caches that store both instruction and data (both referred to hereinafter simply as data), those skilled in the art will appreciate that each of L1 caches 12a–12n could alternatively be implemented as bifurcated instruction and data caches.

In order to minimize latency, data processing system 8 may also include one or more additional levels of cache memory, such as level-two (L2) caches 15a–15n, which are utilized to stage data to L1 caches 12a–12n. L2 caches 15a–15n are positioned on processors 10a–10n. L2 caches 15a–15n are depicted as on-chip although it is possible that they may be off-chip. L2 caches 15a–15n can typically store a much larger amount of data than L1 caches 12a–12n (eg. L1 may store 64 kilobytes and L2 512 kilobytes), but at a longer access latency. Thus L2 caches also occupy a larger area when placed on-chip. Those skilled in the art understand that although the embodiment described herein refers to an L1 and L2 cache, various other cache configurations are possible, including a level 3 (L3) and level 4 (L4) cache configuration and additional levels of internal caches.

As illustrated, data processing system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. Of course, those skilled in the art will appreciate that data processing system 8 can include many additional components which are not shown in FIG. 1, such as serial and parallel ports for connection to network or attached devices, a memory controller that regulates access to system memory 18, etc.

Interconnect 16, which can comprise one or more buses or a cross-point switch, serves as a conduit for communication transactions between processors 10a–10n, system memory 18, I/O devices 20, and nonvolatile storage 22. A typical communication transaction on interconnect 16 includes a source tag indicating the source of the transaction, a destination tag specifying the intended recipient of the transaction, an address and/or data. Each device coupled to interconnect 16 preferably monitors (snoops) all communication transactions on interconnect 16.

FIG. 2A illustrates a single chip representation of a switch topology. In a switch topology, point-to-point connections are implemented, wherein each chip component is provided direct connection to each external component. In the illustrated topology, processor chip 160 (which may alternatively be a multiprocessor chip) contains a processor 162, and on-chip L2 cache 164. These components exist on the lower layer of metallization of the chip. External components, such as memory and I/O 168, are coupled to processor chip 160 via switch 166. Processor chip 160 also contains controller 165, which directs the interface to the external components. This interface 165 directs the transfer of requests and data between processor 162 and memory and I/O 168, respectively. Processor chip 160 may also contain additional components due in part to heavy integration under new silicon technology.

L2 cache 164 occupies a large percentage of the processor chip's area. External switch also occupies a significant amount of space within the data processing system topology. As illustrated in FIG. 2B, described below, the various components occupy space on the motherboard 170 of the data processing system. Switch 166 occupies a significant portion of motherboard space. One side benefit of the invention is that by removing the switch from the motherboard, this significant space may be better utilized to incorporate larger memory and I/O or other components.

FIG. 2B illustrates a four processor chip, multiprocessor, switch topology on a motherboard 170 of a data processing system. Motherboard 170 may include other components not illustrated herein. Processor chips 160a–160d each have a respective processor 162a–162d coupled to memory and I/O 168. Switch 166 is a logic unit/point at which the various buses running from the processor chips 160a–160d, as well as memory and I/O devices 168 terminate.

The invention, as illustrated in FIG. 4, is a representation of a high performance switch, which is integrated and distributed, and is also enhanced to provide lower latencies and higher data bandwidth within the data processing system. The switch may be distributed according to a bit slicing or other configuration settings at the system level. In one embodiment, the switch is placed on the lower layer metallization, with the other components of the processor chip, necessitating a smaller L2 cache or larger processor chip. The preferred embodiment integrates the switch within the upper layers of the processor chip metallization as will be discussed below. As utilized herein, the switch in its integrated and distributed form is represented as an IDS having a related IDS controller as is described below.

FIG. 4 illustrates a distributed and integrated switch topology (i.e., a shared-switch topology) referred to herein as a Fully Interconnected Switch Architecture in accordance with the present invention. The integration and distribution of the switch preferably occurs in a four chip multi-chip configuration as illustrated herein. Four processor chips are illustrated having processor 162a–162d, cache 164, and external memory 168 coupled to the processor chips. Additionally, each processor chip shares a distributed switch and memory/ I/O interface which are controlled by an IDS controller 401 located on-chip. Thus, each chip shares the switch and interface by integrating the switch interconnections (i.e., control logic and wired connections) within one or more of its metal layers. This embodiment assumes an equal distribution of the switches amongst the processor chips; however, other non-equal distributive schemes are possible.

The processor chips are arranged within the data processing system so that they contact at the IDSs, thus providing switch-to-switch contact. Thus the switch related to first processor chip is coupled to the other switches of the other processor chips. In this manner, each processor chip sees the entire switch rather than a portion of the switch and the point-to-point interconnections are complete. Additionally, the memory and I/O are provided direct connection with the switch via the interface.

Placing the switch on-chip requires a large amount of available wiring. The present invention recognizes that the upper layers of metal on the processor chip are sparsely utilized and take advantage of this to integrate the switch on these metal layers. FIG. 3 illustrates a bi-level, multi-layer I/C chip 301 configuration. Specifically, an eight (8) metal layer configuration is depicted divided into an upper and lower level. Most of the processor chip components exists on the lower level 305, layers M0 to M4. The upper level metal layers of the chip (M5–M7) 303 are sparsely utilized because the chip is transistor bounded (i.e., they require more silicon space). Due to improved metallization and dielectric characteristics, these upper level metal layers 303 permit faster propagation than the lower level metal layers 305 making them ideal for use as the switch.

FIGS. 5A and 5B illustrates a processor chip having a switch integrated within the upper level metal layers 303. Processor 160 and cache 307 are connected using lower level metal layers 305. Upper level metal layers 303 run above the lower level metal layers 305. The invention integrates switch 501 above the cache 307. Thus, the switch 501 is made to overlay the array cache.

The IDS controller contains a small number of transistors but a large number of wiring channels. Thus in this embodiment, the top four metal layers of the processor chip are utilized to represent the switch. In this embodiment, the switch is placed only over the cache area of the processor chip, which is typically very large. The top four layers of the SRAM (or DRAM) arrays are "blanketed" with switch metallization. The SRAM is very transistor intensive; however it utilizes only M0–M3 layers. Thus, there are lots of wire channels above the SRAMs for the IDS controller. The IDS controller is integrated above the SRAM rather than being allocated any significant specific on-chip space. Thus a larger overall percentage of the processor chip is utilized resulting in greater overall chip efficiency.

Placing the switch in the upper metal layers also provides for large amounts of redundancy in the switch connections.

This increased redundancy in turn results in improved chip yields, thus minimizing any additional cost of the processor chip. Thus the on-chip switch topology provides better system performance with reduced overall system costs (due to no external switch chips).

In the preferred embodiment, the IDS controller metallization is integrated on the highest levels of metal on the chip. Levels four through seven (4–7) are primarily utilized. In one embodiment, IDS controller metallization is created with a different metal from lower level metals. This further increases the propagation speed of the IDS controller. It is understood, however, that the higher levels are traditionally faster than the lower ones and thus the specialized treatment of the higher levels for implementing switch functions is not a requirement to ensure better overall efficiency. Alternatively, specific interconnects which require faster signal transmission (or propagation) may be made of a metal which enables faster propagation, such as copper. It is understood that metal layers can be any electrical conduit which allows a signal generated within a processor chip or transmitted to a processor chip from external components.

Placing the switch on-chip will necessarily lead to more I/O counts per processor chip. The number of the count is, however, not as critical since the processors share the switch, so that at any one given time, no processor chip has more than a portion of the switch wires to allocate.

The increased efficiency of the integrated distributed chip topology can be shown with comparison to the standard off-chip switch processing. In an of-chip switch topology, a four-hop process is required: (1) address out to switch; (2) from switch to external component; (3) external component back to switch; (4) switch back to chip. In the on-chip topology, the transfer/communication occurs in two hops, i.e. from the source to the destination and back (i.e., eliminate the middle hops). Thus, the latency is significantly reduced.

The invention as implemented allows efficient cache-to-cache transfers, reduces cache-to-cache latencies, and increases data bandwidth. Further it allows for wider data paths (buses) in the IDS, requires minimal additional on-chip space to integrate the switch, and increases the bandwidth to memory and remote caches.

The increased bandwidth and efficiency with processor to memory/I/O operations can be seen with a comparison of FIGS. 2B and 4. In the non-integrated, non-distributed topology, the switch provides four eight-byte buses which access memory and I/O. Each reference to memory/I/O passes through the switch and has corresponding delays per hop as described above. The new FISA topology provides a direct link between the processor and the distributed memory/I/O. Thus approximately one in every four references to memory/I/O do not have to go through the switch. This allows greater bandwidth (i.e., switch bandwidth is not being utilized to connect to the memory/I/O) for implementing other processes. Overall, this leads to greater efficiency in memory/I/O access and larger total available bandwidth. Also, the same effect occurs with the additional direct links to the other processors. The requesting processor does not have to wait on the switch to allocate an interconnect. By communicating directly with the other processors the overall bandwidth and efficiency of the system is improved.

Integration of the switch further allows for certain interconnects which are considered critical paths to be provided special treatment such as providing wider/thicker wires made of copper or other metal which permits faster propagation of signals, shielding of the metal, and/or utilizing "tapered" metal at the destination to increase transmission speed. Special treatment of critical paths has been described in commonly owned patent application having Ser. No. 09/366,600 filed on Aug. 3, 1999, which is hereby incorporated by reference.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention.

What is claimed is:

1. A microprocessor chip comprising:
   a plurality of metal layers delineated into at least a first level and a second level, said first level and said second level being vertically aligned with each other;
   a processor unit integrated into said first level of metal layers; and
   an integrated distributed switch (IDS) integrated into said second level, wherein said IDS provides connectivity between said processor unit and components external to said chip, including other chips, memory and input/output (I/O) devices.

2. The microprocessor chip of claim 1, wherein said IDS includes an IDS controller.

3. The microprocessor chip of claim 1, wherein said IDS includes redundant switching elements to increase reliability of processor chip connections.

4. The microprocessor chip of claim 1, wherein said microprocessor chip is designed for operation within a multi-chip multiprocessor configuration, wherein said IDS is part of a larger system wide IDS which is distributed among all processor chips of said multi-chip multiprocessor such that each processor chip houses a portion of said system wide IDS in its respective second level.

5. The microprocessor chip of said claim 4, wherein said system wide IDS is equally distributed amongst said processor chips.

6. The microprocessor chip of said claim 1, wherein said metal layers of said second level are specially treated to provide faster propagation speeds than said metal layers in said first level.

7. The microprocessor chip of claim 1, further comprising a cache integrated into said first level of metal layers, wherein said IDS is located only in said metal layers above said cache.

8. A multi-chip multiprocessor data processor system comprising:
   processor chips having a processor located on a lower level metal layer of said chips;
   an integrated distributed switch (IDS) for coupling between said processor chips and components external to said processor chips, wherein said switch is fully integrated on said chips within a higher level metal layer of said chips.

9. The data processing system of claim 8, wherein said IDS is controlled by an IDS controller located on each of said processor chips.

10. The data processing system of claim 8, wherein said switch provides point-to-point connection between a first processor chip and said external components, including a second processor chip, memory and I/O devices.

* * * * *